April 8, 1941.   C. SCHMUTZER   2,237,636
METHOD AND APPARATUS FOR PURGING AIR FROM RECEPTACLES
Filed July 9, 1937   2 Sheets-Sheet 2
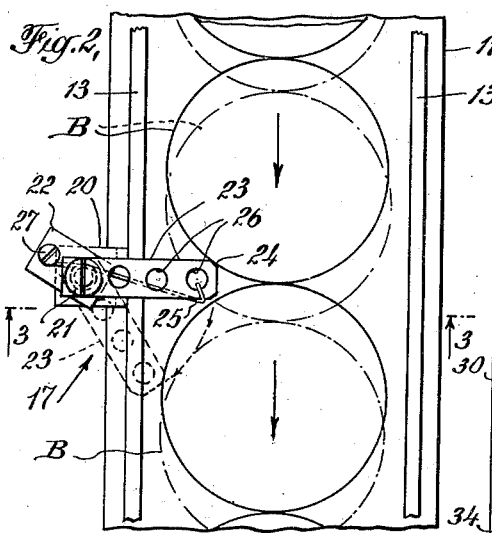
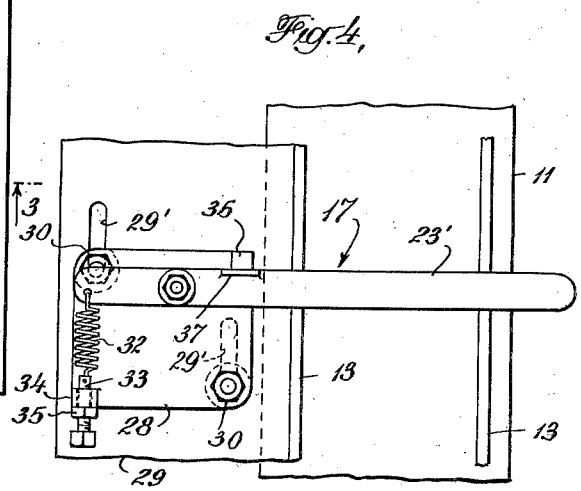
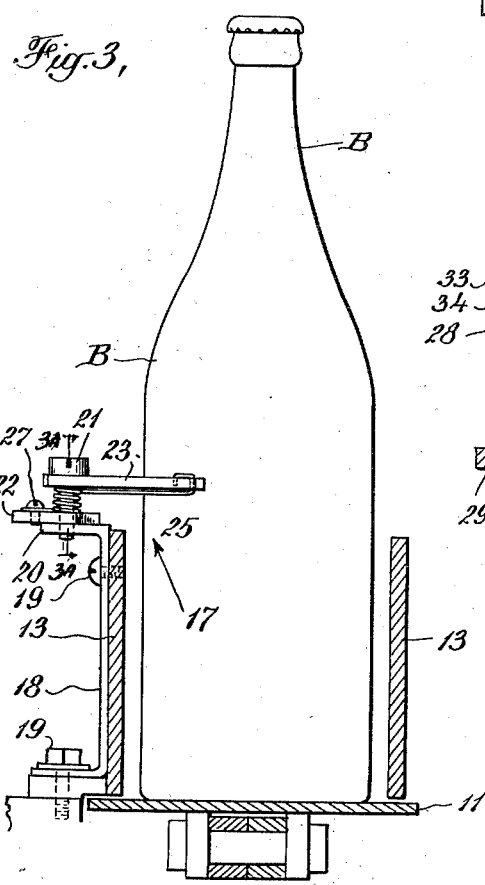
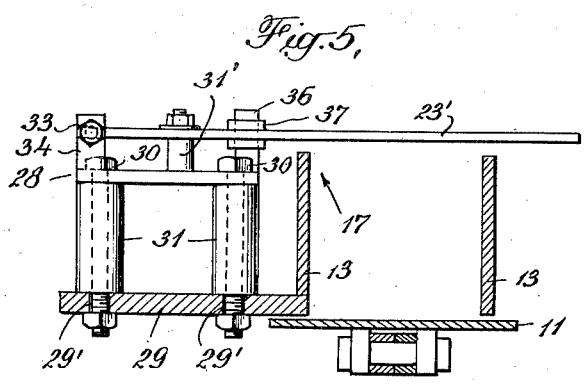
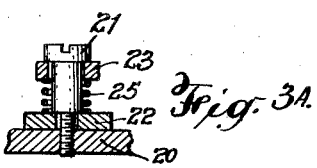
INVENTOR
Charles Schmutzer
BY
Arguet, Feary & Campbell
ATTORNEYS Patented Apr. 8, 1941

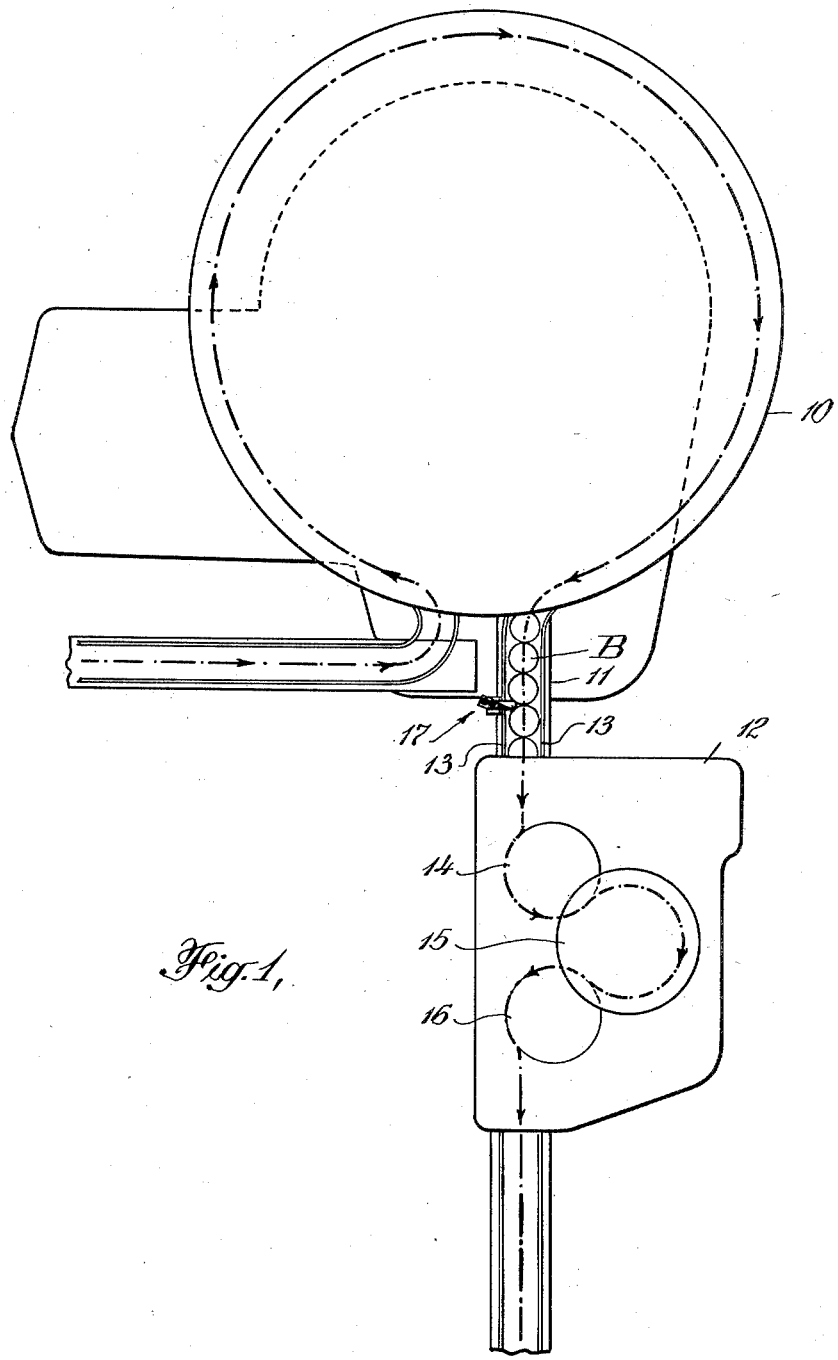

2,237,636

UNITED STATES PATENT OFFICE 2,237,636

METHOD AND APPARATUS FOR PURGING AIR FROM RECEPTACLES

Charles Schmutzer, Irvington, N. J., assignor to Hoffman Beverage Company, Newark, N. J., a corporation of New Jersey Application July 9, 1937, Serial No. 152,736

15 Claims. (Cl. 226—72)

This invention relates to methods and apparatus for purging air from a package of gas-containing liquid, prior to sealing the package.

Carbonated beverages, such as ginger ale and other flavored carbonated soft drinks, and malt beverages, such as beer, ale, and the like, containing carbonic acid gas, are not infrequently adversely affected in flavor by oxidation of their organic contents, due to the air which is trapped between the surface of the liquid in the bottle or other receptacle and the seal. This air enters the bottle during and immediately after the filling operation and remains in the bottle up to and after the bottle is capped in the usual process of packaging liquids. This adverse effect of air is particularly noticeable with beer and other malt beverages that are pasteurized after sealing, for it appears that the altered taste of the beer following pasteurization is largely caused by the oxidation of the aromatic principles of the beer under the pasteurizing heat, because of the presence of the air in the bottle. Recognizing this condition, bottlers of beer and other malt beverages have adopted a process known as "jetting," wherein fine jets of beer are squirted into the filled bottles prior to sealing to cause foaming and consequent ejection of some of the air, but this practice is wasteful of beer and generally unsatisfactory. Also, carbon dioxide has been filled into the space in the receptacle above the liquid before sealing, but that requires expensive additional equipment.

In accordance with the present invention, simple but very effective methods and apparatus are provided for purging all or most of the air remaining in the top of the bottle or other receptacle after filling and replacing it with a portion of the carbon dioxide, that is contained in the beverage or other liquid and is released by agitating the liquid in the receptacle prior to sealing the receptacle.

The practice of the invention includes sharply tapping the bottle or other receptacle, after it has been filled by filling machinery and just prior to the capping or other sealing operation, in order to jar and thus liberate from the carbonated liquid in the receptacle a sufficient quantity of the entrained carbon dioxide to elevate and thus purge the lighter air from the receptacle, so that at the time it is capped or otherwise sealed the air has been wholly or largely removed from the receptacle and the contents are sealed substantially in the absence of air. In the case of beer or other high surface tension liquids, the tapping results in foaming, the foam rising to the lip of the receptacle and thus ejecting the air.

A preferred embodiment of the invention comprises a trigger mechanism which is set and released by the moving receptacles, so that each successive receptacle is tapped in the manner described. One form of this mechanism comprises a spring-pressed arm or lever which is engaged by an advancing receptacle, swung to one side by the latter to tension the spring, and released as the receptacle passes so that the spring snaps the arm or lever smartly against the following receptacle, which then sets the trigger mechanism for engagement with the next succeeding receptacle in the manner described. The position of the tapping mechanism with respect to the capping mechanism depends upon the force of the tap on each receptacle and the extent to which the contents of the bottle are carbonated, so that no more of the gas is liberated than is sufficient to fill the space in the receptacle above the liquid level, whereby the air is wholly or largely purged from the receptacle, and the latter is filled to the lip with carbonic acid gas at the time it is capped or otherwise sealed. The tapping mechanism may be adjusted longitudinally of the conveyor in order to vary its spacing with respect to the capping mechanism, and preferably is adjustable to vary the force of the tap which is imparted to the receptacles for the purpose described. Also, the length of the arm or lever is determined by the relative positions of the respective receptacles as they advance toward the capping mechanism, the greater the spacing between the receptacles the longer the arm or lever, and vice versa.

For a more complete understanding of the invention, reference may be had to the accompanying drawings, in which:

Figure 1 is a diagrammatic illustration of the arrangement of a more or less conventional layout of receptacle filling, capping and conveyor mechanisms, equipped with the tapping mechanism of this invention;

Fig. 2 is an enlarged plan view of one form of the tapping mechanism;

Fig. 3 is a section through the conveyor as seen along the line 3—3 of Fig. 2 and illustrates the tapping mechanism in elevation;

Fig. 3A is an enlarged axial section through the supporting and angular adjusting means for the tapping arm, as seen along the line 3A—3A of Fig. 3;

Fig. 4 is a plan view of a modified form of the tapping mechanism; and

Fig. 5 is an elevation thereof.

Referring to Fig. 1 of the drawings, numeral 10 designates a filling machine of more or less conventional form for filling bottles, cans, or other receptacles with a beverage or other liquid in which carbonic acid or other gas is dissolved, occluded, or otherwise entrained. A conventional form of machine for filling beer into bottles B is shown for purposes of illustration, in which bottles B, filled within a few inches of the lip, are pushed by the filling machine 10 in contact with each other upon the chain type conveyor 11, which advances them between guide rails 13 in this close relationship to the capping machine 12. The capping machine 12 is of conventional form for applying crown caps or the like to bottles B and includes an inlet turret 14, a multiple rotary capping head 15, and discharge turret 16.

Poistioned adjacent the conveyor 11, so that its active part extends into the path of the bottles B being advanced, is the tapping mechanism 17 of this invention. This mechanism 17 is preferably so positioned with respect to the rotary capping head 15 that the carbon dioxide, liberated from the beverage as the result of the jar applied thereto by the mechanism 17, has time to rise and fill the air space to purge all or most of the air from the bottle before the cap is applied thereto. For example, for purposes of purging the air from beer bottles, a distance of approximately two feet between the tapping mechanism 17 and the rotary capping head 15 has been found satisfactory. In the case of beer, by the time that a bottle B moves through this distance at the normal rate, the foam caused by liberation of carbon dioxide by the tap applied by mechanism 17 has risen to the lip of the bottle and consequently purged the air therefrom. For carbonated beverages other than beer, this distance varies, depending again upon the force of the tap which is applied by mechanism 17, the degree of carbonation of the liquid, and the like. Accordingly, the mechanism 17 is preferably made adjustable along the guide rail 13 of the conveyor 11, which supports the mechanism 17 in the manner illustrated in Figs. 2 and 3.

Referring to Figs. 2 and 3, the tapping mechanism 17 includes a supporting frame 18, which is conveniently secured to guide rail 13 of the conveyor 11 or its support by bolts or screws, or both, 19. The frame 18 is provided with an upper lateral extension 20 upon which is secured by means of cap screw 21 the horizontal plate 22. Cap screw 21 is preferably provided with a reduced threaded end passing through an enlarged hole in plate 22 and screwed into flange 20 as shown particularly in Fig. 3A. The shoulder formed by the reduced end of screw 21 abuts the top of plate 22 and cooperates with the threaded connection in flange 20 to lock the plate 22 in place on flange 20 and also to permit angular adjustment of the plate 22 about the cap screw 21 as a pivot. This is done by loosening cap screw 21, twisting plate 22 to the desired angle, and then tightening cap screw 21.

Alternatively, the plate 22 may be twisted to the desired angle by means of a wrench without loosening cap screw 21.

Journalled on cap screw 21 is the tapping arm or lever 23, the free end of which is bevelled at 24 as shown, so as to lie substantially tangent to the curved surface of the bottle B at the time of contact and also to eliminate sharp corners which may chip the bottle or dent a metal receptacle. Arm or lever 23 is urged in a counterclockwise direction as seen in Fig. 2, by a torsion spring 25, one end of which is hooked into one of the lightening holes 26 of arm or lever 23 near its free end, and the other end of which is secured by a set screw 27 on the stationary plate 22. The cap screw 21 passes through the coils of the spring 25 which also serves the additional function of holding the tapping arm or lever 23 against the under side of the head of the cap screw 21. The limit of movement of arm or lever 23 in a counter-clockwise direction is determined by the spring 25 which is so constructed as to unwind to the approximate extent shown in Fig. 2. The angle of the tapping arm or lever 23 with respect to the line of movement of the bottles B may be varied by changing the angular position of plate 22 carrying the spring and arm 23, in the manner described, so that the force of the tap imparted by arm 23 to the bottles may be adjusted to suit the circumstances.

In operation, the bottles or other receptacles, partially filled, are advanced successively in contact or in close proximity by conveyor 11 and as each bottle passes the tapping mechanism 17, it moves the tapping arm or lever 23 about its pivot in a clockwise direction to the position indicated in dotted lines in Fig. 2, which results in tensioning the spring 25. As the bottle continues to advance, the free end of tapping arm or lever 23 slips over the surface of the bottle until released thereby, whereupon the stored-up tension in the spring 25 snaps the tapping arm or lever 23 against the succeeding bottle, imparting to it a sharp tap which agitates the liquid in the bottle B and causes it to release some of the entrained carbon dioxide, which, being heavier than the air, forces the air out over the lip of the bottle B and remains in place of the air until the bottle is sealed or capped by the capping mechanism 15. As has been mentioned, in the case of beer or other readily foaming liquids, the action of the gas released from the liquid by the tapping mechanism results in foaming, the bubbles of which rise to the lip of the bottle in the manner described and remain until the bottle is capped.

The distance between the tapping and capping mechanism is selected so that the bubbles of the foam will not have time to break to any extent, because the resulting blast ejects some of the carbon dioxide contained in the bubbles and allows air to take its place. In the case of carbonated beverages other than beer, the spacing of the tapping mechanism 17 from the capping mechanism 15 is not of such great moment, although the space should not be so great as to allow loss of the gas due to excessive tapping or spilling of the gas before sealing. For use with all beverages or under all conditions, it is preferred that the frame 18 be made adjustable along the rail 13 by providing a series of holes for bolts and screws 19, or in the alternative, slots in the frame 18 through which the bolts or screws pass, so that the frame may be adjusted within limits along the rail 13.

In the alternative form of the invention illustrated in Figs. 4 and 5, the tapping mechanism 17 comprises a base plate 28 which is secured to the frame 29 of one of the guide rails 13 through elongated adjusting slots 29' by means of two diagonally-positioned bolts 30 fitted with the spacers 31 which locate the base plate 28 in the proper elevated position. Base plate 28 is provided with a boss 31' on which the tapping arm or lever 23' is pivoted. Connected to the inner end of the tapping arm or lever 23' is a coil spring 32, the other end of which is connected to a threaded stud 33 which is slidable through a lug 34 on base plate 28. A nut 35 on stud 33 may be adjusted therealong to vary the tension of the spring 32 and thus vary the force of the tap applied by arm 23' to the receptacles. Movement of the tapping arm or lever 23' in a counter-clockwise direction under the tension of spring 32 is limited by an abutment 36 on base plate 28 and the arm of lever 23' is provided with a contact plate 37 which engages abutment 36.

The operation of the modification illustrated in Figs. 4 and 5 is identical to that illustrated in Figs. 2 and 3 except that the movement of the tapping arm or lever 23' in a counter-clockwise direction under the tension of the corresponding spring 32 is limited by a positive stop 36, whereas in the form shown in Figs. 2 and 3, this movement of the tapping arm or lever is resiliently limited by the spring 25 itself when in untensioned position. The arrangement of Figs. 4 and 5 is designed particularly for operation with bottles or other receptacles that are spaced apart on the conveyor, which requires a longer arm 23'. The stop abutment prevents the arm 23' from being swung out of the path of the bottles when no bottles are moving on the conveyor. For adjustment to and from the capping machine 12, the bolts 30 may be loosened and the mechanism moved longitudinally of the conveyor 11 by repositioning the bolts in the corresponding slots 29'.

Although the invention has been illustrated and described particularly in connection with purging of air from the space above gas-containing liquids in beverage receptacles, between the filling and sealing stations, it may be applied with equal facility to the purging of air from any receptacle partially filled with a liquid containing an entrained gas which is subject to liberation by jarring or other agitation, and further, while certain preferred embodiments of the invention have been illustrated and described herein, it is to be understood that the invention is not limited thereto but is susceptible of changes in form and detail within the scope of the appended claims.

I claim:

1. The method of packaging beverages containing carbon dioxide which comprises partially filling a receptacle with the beverage in an atmosphere containing air whereby the space in the receptacle above the liquid will contain air, jarring the receptacle to cause a part of the carbon dioxide in the liquid to be liberated and thereby expel at least a part of the air from the space above the liquid, and then sealing the receptacle.

2. The method of packaging beverages containing carbon dioxide which comprises partially filling a receptacle with the beverage in an atmosphere containing air whereby the space in the receptacle above the liquid will contain air, tapping the receptacle to cause a part of the carbon dioxide in the liquid to be liberated and thereby expel at least a part of the air from the space above the liquid, and then sealing the receptacle.

3. A system for packaging carbonated beverages comprising means for partially filling a receptacle with the beverage in an atmosphere containing air whereby the space in the receptacle above the liquid will contain air, a closure-applying means, means for transferring the receptacle from the receptacle-filling means to the closure-applying means, and means for jarring the receptacle while it is in transit from the receptacle-filling means to the closure-applying means to cause a portion of the carbon dioxide in the beverage to be liberated, whereby the same will rise to the surface of the liquid and displace at least a part of the air in the receptacle above the liquid.

4. A system for packaging carbonated beverages comprising means for partially filling a receptacle with the beverage in an atmosphere containing air whereby the space in the receptacle above the liquid will contain air, a closure-applying means, means for transferring the receptacle from the receptacle-filling means to the closure-applying means, and means for tapping the receptacle while it is in transit from the receptacle-filling means to the closure-applying means to cause a portion of the carbon dioxide in the beverage to be liberated, whereby the same will rise to the surface of the liquid and displace at least a part of the air in the receptacle above the liquid.

5. A system for packaging carbonated beverages comprising means for partially filling receptacles with the beverage in an atmosphere containing air whereby the space in the receptacles above the liquid will contain air, a closure-applying means, means for transferring the receptacles from the receptacle-filling means to the closure-applying means, and means responsive to the movement of the receptacles for jarring the receptacles while in transit from the receptacle-filling means to the closure-applying means to cause a portion of the carbon dioxide in the beverage to be liberated, whereby the same will rise to the surface of the liquid and displace at least a part of the air in the receptacles above the liquid.

6. A system for packaging carbonated beverages comprising means for partially filling receptacles with the beverage in an atmosphere containing air whereby the space in the receptacles above the liquid will contain air, a closure-applying means, means for transferring the receptacles from the receptacle-filling means to the closure-applying means, and means responsive to the movement of the receptacles for tapping the receptacles while in transit from the receptacle-filling means to the closure-applying means to cause a portion of the carbon dioxide in the beverage to be liberated, whereby the same will rise to the surface of the liquid and displace at least a part of the air in the receptacles above the liquid.

7. A system for packaging carbonated beverages comprising means for partially filling a receptacle with the beverage in an atmosphere containing air whereby the space above the liquid will contain air, a closure-applying means, means for transferring the receptacle from the receptacle-filling means to the closure-appling means, means for jarring the receptacle while it is in transit from the receptacle-filling means to the closure-applying means to cause a portion of the carbon dioxide in the beverage to be liberated, whereby the same will rise to the surface of the liquid and displace at least a part of the air in the receptacle above the liquid, and means for adjusting the relative position of the receptacle-jarring means with respect to the closure-applying means.

8. A system for packaging carbonated beverages comprising means for partially filling receptacles with the beverage in an atmosphere containing air whereby the space above the liquid will contain air, a closure-applying means, means for transferring the receptacle from the receptacle-filling means to the closure-applying means, means for tapping the receptacle while it is in transit from the receptacle-filling means to the closure-applying means to cause a portion of the carbon dioxide in the beverage to be liberated, whereby the same will rise to the surface of the liquid and displace at least a part of the air in the receptacle above the liquid, said tapping means comprising an oscillatable arm normally lying in the path of a receptacle in transit from the receptacle-filling means to the closure-applying means, said oscillatable arm being displaceable by the force of a moving receptacle, and means tending to quickly return said arm to its normal position when the receptacle moves past the end of the arm, whereby the arm strikes against the following receptacle to jar the same.

9. In apparatus for liberating gas from carbonated beverage in receptacles, a pathway along which the receptacles are adapted to move, a tapping device including a member adapted to strike the receptacles and normally positioned in the path of a receptacle as it moves along said pathway, said member being operable by the movement of a receptacle there past to cause it to strike the following receptacle with force sufficient to jar the same and the liquid therein, to cause a portion of the carbon dioxide in the liquid to be liberated.

10. In apparatus for liberating gas from carbonated beverage in receptacles, a pathway along which the receptacles are adapted to move, a tapping device including a pivotally mounted tapping member normally positioned in the path of a receptacle as it moves along said pathway, said member being operable by the movement of a receptacle there past to cause it to strike the following receptacle with force sufficient to jar the same and the liquid therein, to cause a portion of the carbon dioxide in the liquid to be liberated.

11. In apparatus for liberating gas from carbonated beverage in receptacles, a pathway along which the receptacles are adapted to move, a tapping device including a pivoted member which acts as a tapper and which normally is positioned in the path of the receptacles as they move along said pathway, a spring tending to maintain said member in such normal position, said member being operable by the movement of a receptacle there past to cause an oscillation of said member and a striking of the following receptacle thereby as it returns to its normal position under the influence of said spring, with force sufficient to jar the same and the liquid therein, to cause a portion of the carbon dioxide in the liquid to be liberated.

12. In apparatus for liberating gas from carbonated beverage in receptacles, a pathway along which the receptacles are adapted to move successively, a pivoted arm adjacent said pathway, and resilient means urging said arm into the path of the moving receptacles for engagement, displacement about its pivot, and release by a leading receptacle, whereby the arm is caused by said resilient means to engage the following receptacle, and jar the contents thereof to liberate a portion of the carbon dioxide therefrom.

13. In apparatus for liberating gas from carbonated beverage in receptacles, a pathway along which the receptacles are adapted to move successively, an arm pivoted adjacent said pathway and normally positioned at an angle in the path of the moving receptacles, a spring holding said arm in said position and tending to restore the same to that position upon displacement, and means for moving said receptacles along said pathway for successive engagement by said arm, the leading receptacle displacing said arm about its pivot and then releasing it, and said spring forcing said arm against the following receptacle to jar the contents thereof for liberating a portion of the carbon dioxide therefrom.

14. In apparatus for liberating gas from carbonated beverage in receptacles, a pathway along which the receptacles are adapted to move successively, an arm pivoted adjacent said pathway and normally positioned at an angle in the path of the moving receptacles, a spring holding said arm in said position and tending to restore the same to that position upon displacement, means for moving said receptacles along said pathway for successive engagement by said arm, the leading receptacle displacing said arm about its pivot and then releasing it, and said spring forcing said arm against the following receptacle to jar the contents thereof for liberating a portion of the carbon dioxide therefrom, and means for shifting said spring to vary the normal angular position of said arm.

15. In apparatus for liberating gas from carbonated beverage in receptacles, a pathway along which the receptacles are adapted to move successively, a supporting element adjacent said pathway, an arm pivoted on said element, a spring between said element and arm and normally urging the latter at an angle in the path of the moving receptacles, said element being adjustable to vary said angular position of the arm, and means for moving said receptacles along said pathway for successive engagement by said arm, whereby the leading receptacle displaces said arm about its pivot and then releases it for engagement with the following receptacle for jarring the contents thereof to liberate a portion of the gaseous content thereof.

CHARLES SCHMUTZER.